United States Patent

Kanbayashi et al.

Patent Number: 5,326,819
Date of Patent: Jul. 5, 1994

[54] WATER ABSORBENT POLYMER KEEPING ABSORBED WATER THEREIN IN THE FORM OF INDEPENDENT GRAINS

[75] Inventors: Taiji Kanbayashi, Nara; Chuzo Kato, Tokyo, both of Japan

[73] Assignee: Oosaka Yuuki Kagaku Kogyo Kabushiki Kaisha, Oosaka, Japan

[21] Appl. No.: 773,495

[22] Filed: Oct. 9, 1991

Related U.S. Application Data

[60] Division of Ser. No. 673,170, Mar. 18, 1991, Pat. No. 5,029,933, which is a continuation of Ser. No. 337,889, Apr. 14, 1989, abandoned.

[30] Foreign Application Priority Data

Apr. 16, 1988 [JP] Japan .................. 53-94308

[51] Int. Cl.$^5$ .................................... C08L 63/00
[52] U.S. Cl. ........................ 525/119; 525/246; 525/329.7; 525/910; 525/936; 525/939; 523/502
[58] Field of Search ............ 525/119, 329.7, 246, 525/910, 936, 939; 523/502

[56] References Cited

U.S. PATENT DOCUMENTS

| | | | |
|---|---|---|---|
| 4,061,846 | 12/1977 | Gross et al. | 525/329.7 |
| 4,172,066 | 10/1979 | Zweigle et al. | 526/306 |
| 4,507,438 | 3/1985 | Obayashi et al. | 525/119 |
| 4,666,975 | 5/1987 | Yamasaki et al. | 525/119 |
| 4,755,560 | 7/1988 | Ito et al. | 525/329.7 |
| 4,783,510 | 11/1988 | Saotome | 525/329.7 |
| 4,847,329 | 7/1989 | Koleske et al. | 525/119 |
| 4,879,361 | 11/1989 | Rehmer et al. | 526/201 |
| 5,055,501 | 10/1991 | Mariya et al. | 525/119 |

FOREIGN PATENT DOCUMENTS

| | | | |
|---|---|---|---|
| 0044627 | 3/1982 | Japan | 525/329.7 |
| 2223203 | 10/1987 | Japan | 525/119 |

Primary Examiner—Melvyn I. Marquis
Assistant Examiner—Randy Gulakowski
Attorney, Agent, or Firm—Wenderoth, Lind & Ponack

[57] ABSTRACT

A method for the production of water absorbent polymer beads which retain a bead like shape after the absorption of water, wherein the absorbent beads are used in the manufacturing of concrete/mortar.

4 Claims, 2 Drawing Sheets

| ALKYL ESTER | CARBON NUMBER OF ALKYL GROUP | ACRYLIC ESTER | METHACRYLIC ESTER |
|---|---|---|---|
| 2-ETHYLEHEXYL | 8 | −85°C | −10°C |
| LAURYL | 12 | +15°C | −65°C |
| LAURYL, TRIDECYL | 12,13 | >+15°C | <−46°C |
| TRIDECYL | 13 | +20°C | −46°C |
| STEARYL | 18 | >+35°C | +38°C |

| ALKYL ESTER | CARBON NUMBER OF ALKYL GROUP | ACRYLIC ESTER | METHACRYLIC ESTER |
|---|---|---|---|
| 2-ETHYLEHEXYL | 8 | −85°C | −10°C |
| LAURYL | 12 | +15°C | −65°C |
| LAURYL, TRIDECYL | 12,13 | >+15°C | <−46°C |
| TRIDECYL | 13 | +20°C | −46°C |
| STEARYL | 18 | >+35°C | +38°C |

FIG. 1

| SAMPLE NO. | WATER ABSORBENCY (g/g) | | PARTICLE SIZE OF DRY POLYMER ($\mu m$) | PARTICLE SIZE WHEN WATER IS ABSORBED (mm) | PARTICLE INDEPENDENCE WHEN WATER IS ABSORBED |
|---|---|---|---|---|---|
| | ION EXCHANGE WATER | 0.9% SALT WATER | | | |
| EXAMPLE-1 | 125 | 33 | 120 | 0.48 | ○ |
| 2 | 110 | 30 | 50 | 0.20 | ○ |
| 3 | 150 | 33 | 170 | 0.62 | ○ |
| 4 | 180 | 35 | 90 | 0.30 | ○ |
| 5 | 200 | 35 | 100 | 0.31 | ○ |
| 6 | 80 | 26 | 120 | 0.45 | ○ |
| COMPARISON EXAMPLE-1 | 540 | 58 | 110 | 0.39 | △ |
| 2 | 160 | 37 | MEASUREMENT IMPOSSIBILITY (THE SECOND CONDENSATION) | MEASUREMENT IMPOSSIBILITY | × |
| 3 | 260 | 42 | 500 | 1.6 | × |

FIG. 2

WATER ABSORBENT POLYMER KEEPING ABSORBED WATER THEREIN IN THE FORM OF INDEPENDENT GRAINS

This application is a divisional of 07/673,170, filed Mar. 18, 1991, U.S. Pat. No. 5,029,933 which is a continuation of 07/337,889, filed Apr. 14, 1987, which is abandoned.

A method for the production of fine grain ice and dry clathrate water for manufacturing of concrete/mortar, a method for the production of concrete/mortar by using fine grain ice or dry clathrate water and concrete/mortar products manufactured by the method for production of concrete/mortar.

BACKGROUND OF THE INVENTION

This invention relates to a production method for fine grain ice or dry clathrate water for manufacturing of concrete/mortar, a production method of concrete/mortar by using fine grain ice or dry clathrate water and concrete/mortar products manufactured by the production method of concrete/mortar. Fine grain ice and dry clathrate water for manufacturing the concrete/mortar of this invention are used when the concrete/mortar is manufactured by use of a small amount of water.

It is possible that concrete/mortar is easily manufactured by making use of fine grain ice or dry clathrate water at a place where it is difficult to supply with water.

In the case where concrete/mortar is manufactured in a conventional method, much more water is used than the amount of water necessary for hydration of cement in order to uniformly mix and temper cement and water and to keep good flowability as well. However, there is an inconvenience in this method in that the strength and durability of concrete/mortar after solidification are lower than the concrete/mortar prepared by use of the amount of water close to theoretical hydration quantity.

For this reason, the technique to mix cement or cement and aggregate with fine grain ice instead of water has been studied and is known. The features are as follows.

1) Since powder mixture can be performed with cement, mixing can be performed in low water cement ratio.

2) Loss in slump in proportion to the passage of time is small after mixing.

3) The control of temperature for mass concrete can be easily performed.

In the case where this concrete mixing technique is actually applied, however, it is necessary to manufacture fine grain ice and this method is in question. In a conventional method, fine grain ice is obtained by crushing cubed ice. In the case where fine grain ice is obtained by crushing cubed ice, the defects are as follows.

1) In case where a large amount of fine grain ice is fed, a big plant equipped with special devices such as an ice crusher and a slicer is necessary.

2) Fine grain ice must be kept at a low temperature until it is used and an ice storing unit is necessary to do so. Therefore, the control of the manufacturing process is troublesome and the cost is high.

SUMMARY OF THE INVENTION

The inventors of the present invention have made studies in order to improve the conventional defects and made the present invention based on such studies. That is, when fine grain ice or dry clathrate water is used for a cement mixture, concrete/mortar can be easily manufactured by a small amount of water without the above-mentioned unit. In this event, fine grain ice is made in such a manner that water is impregnated into the water absorbent polymer, capable of maintaining independent fine grains by incorporating water in the structure in a water absorbing state, to freeze. Moreover, dry clathrate water is made in such a manner that water is impregnated into the water absorbent polymer.

The production method of fine grain ice or dry clathrate water for manufacturing of concrete/mortar in the present invention has the following characteristics.

1) Fine grain ice or dry clathrate water particle having a stable particle size can be easily manufactured. stable particle size can be easily manufactured.

2) It is unnecessary to keep fine grain ice at a low temperature until it is used and it can be used as is or by freezing just before mixture.

3) It is unnecessary to manufacture it in a specific location and manufacturing can be easily performed at an optional place in the available time.

4) The method can be easily applied to an existing ready-mixed concrete plant.

5) Water can be transported as fine particles to a place which is impossible to supply with water.

Moreover, the production method of concrete/mortar in the present invention has the following characteristics.

1) Low water cement ratio of high strength concrete/mortar can be easily manufactured.

2) Continuous production is easily performed by extrusion molding and roller molding. Further, products can be easily enlarged in length.

3) Since the water absorbent polymer is included in the mixture, a remarkable effect in the prevention of surface dew condensation and efflorescence is noted.

BRIEF DESCRIPTION OF THE DRAWINGS

FIG. 1 is a view for showing a glass transition point of each monomer; and

FIG. 2 is a view for showing the result of evaluation of water absorbent polymer in the examples 1 through 6 and the comparison examples 1 through 3.

DESCRIPTION OF THE PREFERRED EMBODIMENTS

Water absorbent polymer for use in the present invention is obtained in such a manner that acrylic copolymer is dissolved in aliphatic hydrocarbon, acrylic acid and its alkali metallic salt aqueous solution are dispersed, polymerization is performed by a W/O (water/oil) type suspension polymerization method and crosslinking is performed in the presence or absence of an inorganic compound by means of a cross-linking agent to dry.

The acrylic copolymer to be used as dispersing agent when the water absorbent polymer for use in the present invention is manufactured is copolymer in which the following are the components.

(a) alkyl acrylates or alkyl methacrylates, monomers in which the carbon number of alkyl groups is 8 or more than 8 are 40-95 weight percent.

(b) one or more kinds of monomers selected from among acrylic acid derivatives or methacrylic acid derivatives or acrylic amide derivatives or methacrylic amide derivatives containing the carboxyl group, amino group, quaternary ammonium group or hydroxyl group are 5–40 weight percent.

(c) unsaturated monomers capable of copolymerizing with the above-mentioned (a), (b) are 0–40 weight percent.

Alkyl acrylates or alkyl methacrylates in the component (a) are available if the carbon number of alkyl groups is 8 or more than 8 and monomers which are on sale and easily available are 2-ethylhexyl acrylate, 2-ethylhexyl methacrylate, lauryl acrylate, lauryl methacrylate, tridecyl acrylate, tridecyl methacrylate, mixture of lauryl acrylate and tridecyl acrylate, stearyl acrylate, stearyl methacrylate and the like.

In the case where component (a) is employed, the higher a glass transition point is and the harder it is for bead blockage to occur when the dispersing agent is synthesized in an O/W (oil/water) type suspension polymerization. Therefore, the use of component (a) is convenient. A glass transition point of each monomer will be shown in FIG. 1.

For instance, 2-ethylhexyl methacrylate, lauryl acrylate, mixture of lauryl acrylate and tridecyl acrylate, tridecyl acrylate, stearyl acrylatate, stearyl methacrylate and the like are available.

Acrylic acid derivatives or methacrylic acid derivatives or acrylic amide derivatives or methacrylic amide derivatives containing the carboxyl groups, amino group, quaternary ammonium group or hydroxyl group in the component (b) are acrylic acid, methacrylic acid, itaconic acid, dimethylaminoethyl acrylate, dimethylaminoethyl methacrylate, diethylaminoethyl acrylate, diethylaminoethyl methacrylate, acryloyloxyethyltrimethylammonium chloride, methacryloyloxyethyltrimethylammonium chloride, 2-hydroxyethyl acrylate, 2-hydroxyethyl methacrylate, 2-hydroxypropyl acrylate, 2-hydroxypropyl methacrylate, acrylamide, dimethylacrylamide, dimethylaminopropylacrylamide, dimethylaminopropylmethacrylamide, acrylamidepropyltrimethylammonium chloride, methacrylamidepropyltrimethylammonium chloride and the like.

Monomers in the component (c) are alkyl methacrylates in which the glass transition point is high, having affinity with aliphatic hydrocarbon solvent and the monomers in which the carbon number of alkyl group is less than 5 and vinyl acetate are mentioned. For instance, methyl methacrylate, ethyl methacrylate, isopropyl methacrylate, n-butyl methacrylate, isobutyl methacrylate and vinyl acetate are mentioned and methyl methacrylate, ethyl methacrylate and isobutyl methacrylate are suitable.

The constitution ratio of the components (a), (b) and (c) largely influences dispersion solubility to aliphatic hydrocarbon solvent, colloid dispersibility of polymerization and the property of water absorbent polymer, for instance, water absorbency, particle independence when water is absorbed, particle strength and particle size.

In general, the component (a) is 40–95 weight percent, the component (b) is 5–40 weight percent and the component (c) is 0–40 weight percent as a good value. It is more desirable that component (a) is 45–70 weight percent, the component (b) is 5–25 weight percent and the component (c) is 20–40 weight percent. In the case where component (a) is less than 40 weight percent, the dispersion solubility in the solvent is lowered. In the case where the component (a) is more than 95 weight percent, the colloid dispersbility gets relatively worse when component (b) is less than 5 weight percent. In both cases, it is difficult to continue W/O type suspension polymerization. Component (a) has a tendency such that the higher the percentage by weight in the range between 40 and 95 percent, the better the dispersion solubility in the solvent, the better particle independence of water absorbent polymer when water is absorbed and the better the particle strength become. In the case where the component (b) is less than 5 weight percent, the colloid dispersibility gets worse as described before. In the case where component (b) is more than 40 weight percent, the dispersion solubility in the solvent is lowered. In both cases, it is difficult to continue W/O type suspension polymerization.

The component (b) has a tendency such that the higher the percentage by weight in the range between 5 and 40, the better the colloid dispersibility of polymerization is and the more the water absorbing rate of water absorbent polymer accelerates. On the contrary, in this case, the particle independence when water is absorbed and the particle strength are lowered and the particle size becomes fine. In the case where component (c) is more than 40 weight percent, the ratio of component (a) is relatively lowered and the dispersibility in the solvent gets worse. The higher the percentage by weight in the boundary between 0 and 40, the higher the particle strength of water absorbent polymer is.

The acrylic copolymer which is used as the dispersing agent in the present invention is synthesized by means of an O/W type suspension polymerization method. In solution polymerization, there are a few cases where solvent remains or the function as a dispersing agent is inferior due to low molecular weight polymer. The example of O/W type suspension polymerization method is as follows. That is, partial saponified polyvinyl alcohol is heated and dissolved in ion exchange water, after the atmosphere is replaced with $N_2$, the solution in which initiator of azo type or peroxide type is dissolved is added dropwise and is dispersed in the monomer of components (a), (b), (c) and the polymerization is finished by continued heating. After cooling, solid matter is filtered and washed and bead-like acrylic copolymer, that is, dispersing agent is obtained by drying under reduced pressure.

The dispersing agent obtained by the above-described method is dispersed and dissolved in the aliphatic hydrocarbon solvent of W/O type suspension polymerization. The quantity of dispersing agent is used in the 0.1 to 10 weight percent range with respect to acrylic acid and its alkali metallic salt monomer and the better range is 0.5 to 5 weight percent. When the quantity of dispersing agent is less than 0.1 weight percent, the colloid dispersibility of polymerization is deteriorated. When it is more than 10 weight percent, the fineness of particle size becomes a negative economic factor.

The acrylic acid and its alkali metallic salt aqueous solution is adjusted in such a manner than acrylic acid monomer is partially neutralized by means of an aqueous solution such as sodium hydroxide and potassium hydroxide. It is better, in consideration of water absorbency power and safety, that the degree of neutralization is 60 to 85%. The concentration of monomer in aqueous solution is 35 to 75 weight percent, with the better concentration being 40 to 70 weight percent.

In the present invention, it presents no difficulty that the unsaturated monomer capable of copolymerizing with acrylic acid and its acrylic acid alkali metallic salt monomer be copolymerized with acrylic acid and its acrylic acid alkali metallic salt monomer.

In the case where acrylic acid is polymerized with its alkali metallic aqueous solution by the W/O type suspension polymerization method in the present invention, the initiator is the self-crosslinking type in which a cross-linking agent for the monomer isn't used. Therefore, the better initiator is a water soluble persulfate such as potassium persulfate and ammonium persulfate and hydrogen peroxide. The quantity of initiator for use is 0.1 to 2.0 weight percent to monomer and the better quantity is 0.2 to 1.0 weight percent.

Aliphatic hydrocarbon solvent of W/O type suspension polymerization in the present invention is aliphatic hydrocarbon such as n-pentane, n-hexane, n-heptane or n-octane, an alicyclic hydrocarbon such as cyclohexane, methylcyclohexane or decaline. The preferred solvent is a mixture of n-hexane, n-heptane and cyclohexane.

When the water absorbent polymer is manufactured for the present invention, the other important factor is that cross-linking reaction is performed by means of cross-linking agent in the presence or in the absence of an inorganic compound after W/O type suspension polymerization.

The cross-linking agent for use in the present invention may be a compound having two or more functional groups capable of reacting with a carboxyl group (or carboxylate group). Such a cross-linking agent is polyglycidyl ether such as ethylene glycol diglycidyl ether, polyethylene glycol diglycidyl ether and glycerin triglycidyl ether, a halogenated epoxy compound such as epichlorohydrin and α-methyl chlorohydrin, a kind of polyaldehyde such as glutaraldehyde and glyoxal and the like. The preferred one is ethylene glycol glycidyl ether.

The amount of cross-linking agent differs with the kind of cross-linking agent and kind of dispersing agent and the proper range is usually 0.05 to 2 weight percent to acrylic acid and its alkali metallic said monomer. When the quantity of the above-described cross-linking agent for use is less than 0.05 weight percent, the particle independence when water is absorbed and the particle strength are bad. When it is more than 2 weight percent, the cross-linking density is too high. Therefore, the water absorbency is remarkably lowered.

In case of the cross-linking reaction, the particle independence when water is absorbed is further increased by adding an inorganic compound. The inorganic compound is, for instance, white carbon, talc, hydrotalcite, pulverized silica (commercially available under the trademark "Aerosil" made by NIPPON AEROSIL KABUSHIKI KAISHA). On this occasion, it presents no difficulty that a surface active agent is added. Further, well-known nonionic surface active agents and the like are used.

The method of cross-linking reaction is to add the cross-linking agent during azeotropic distillation and heating and drying under reduced pressure as well-known and the addition during azeotropic distillation is easy.

The water absorbent polymer for use in the present invention is different from commercially produced polymers and shows particle independence when water is absorbed. The greater the amount of component (a) of acrylic copolymer as dispersing agent is and the greater the amount of cross-linking agent is, the more effects are noted. It can therefore be presumed that slippage of the water absorbed polymer concerns the above-described particle independence. The component (a) of the dispersing agent upgrades the water repellency of the water absorbed polymer and by upgrading the cross-linking rate of the polymer, the cross-linking agent increases the water absorbing rate and decreases surface tacking. By these effects, the water absorbed bead-like polymer particles slip by each other, become porous and exhibit particle independence and flowability, since water as binder is low.

Fine grain ice for production of concrete/mortar in the present invention is obtained in such a manner that the above-mentioned water absorbent polymer absorbs the necessary quantity of water to freeze so as to keep independent fine grains. Water can be absorbed up to the water absorbency of polymer (100 to 200 times that of the polymer weight in ion exchange water). Dry clathrate water for production of concrete/mortar is obtained only in such a manner that the above-mentioned water absorbent polymer absorbs a necessary quantity of water. It is desirable that the amount of water to be absorbed is less than half of the water absorbency of polymer in order to keep independent fine grains.

The particle size of fine grain ice or dry clathrate water can be freely varied in the 0.03 to 3.0 mm range by changing the particle size of water absorbent polymer and the amount of water to be absorbed and can be selected in accordance with working condition when the cement is mixed.

Concrete/mortar is manufactured in such a manner that fine grain ice or dry clathrate water of the present invention is mixed with cement or cement and aggregate in powder condition and water is expelled to the outer portion of the mixture by means of pressure molding or extrusion molding methods so as to cause hydration with the surrounding cement.

Thereafter, the method of the present invention will be concretely explained according to the examples. However, the present invention isn't restricted by these examples.

Water absorbency, particle size and particle independence when water is absorbed were obtained by the following operations as shown below.

The value of water absorbency in ion exchange water was obtained in such a manner that dry polymer 0.5 g was dissipated in 1 liter of ion exchange water, the swelling polymer weight (W) obtained by filtering by means of 80-mesh wire gauze after standing for twenty-four hours was measured and this value was divided by the original dry polymer weight (Wo). That is to say, it was decided that the water absorbency of ion exchange water (g/g) was W/Wo.

The value of the water absorbency of 0.9% salt water was obtained in such a manner that dry polymer 0.2 g was dispersed in 0.9% salt water 60 g, the swelling polymer weight (W) obtained by filtering by means of 100-mesh wire gauze after standing for twenty minutes was measured and this value was divided by the original dry polymer (Wo). That is, it was decided that the water absorbency of 0.9% salt water (g/g) was W/Wo.

The particle size of water absorbent polymer (in dry condition) was measured by means of an automatic grading distribution measuring apparatus CAPA-300 made by HORIBA SEISAKUSHO KABUSHIKI KAISHA by using the decanter method. And, it was decided that median on a basis of the area was particle size.

It was decided that the particle size of water absorbed polymer was the average obtained on a basis of the photographing of an optical microscope after ion exchange water 50 cc was added to dry polymer 1.0 g and the polymer absorbed all of the water. The particle independence when water was absorbed was judged by the following standard.

o: Each particle is independent and has flowability.
Δ: Each particle is partially dependent and inferior in flowability.
x: Each particle shows gelation dependence perfectly and has no flowability.

Examples of the composition of the dispersing agent (acrylic copolymer) will be shown hereinafter.

COMPOSITION EXAMPLE 1

Ion exchange water 150 g was fed in a 500 ml separatory flask equipped with an agitator, a reflux condenser, a dropping funnel, a thermometer and a nitrogen gas introduction tube, partially saponified polyvinyl alcohol (GH-23 made by NIHON GOHSEI KAGAKU KABUSHIKI KAISHA) 0.2 g was added as a dispersing agent and the atmosphere was replaced with $N_2$ after heating and dissolution.

On the other hand, azobisdimethylvaleronitrile 1.0 g was added to mixture of lauryl acrylate and tridecyl acrylate (LTA made by OHSAKA YUKI KAGAKU KABUSHIKI KAISHA) 32.5 g, hydroxyethyl methacrylate 10.0 g and methyl methacrylate 17.5 g in a conical flask in advance to dissolve, it was dropped into the above-mentioned separatory flask for one hour under nitrogen bubbling; it was maintained for 5 hours at 65° C., the reaction was finished; the solid matter was filtered after cooling to wash and to dry under reduced pressure and the bead-like dispersing agent (1) was obtained.

COMPOSITION EXAMPLE 2

The bead-like dispersing agent (2) was obtained by operating in the same way as Composition Example 1 except using mixture of lauryl acrylate and tridecyl acrylate 25.0 g, methacrylic acid 5.0 g, dimethylaminoethyl methacrylate 5.0 g and methyl methacrylate 17.5 g.

COMPOSITION EXAMPLE 3

The bead-like dispersing agent (3) was obtained by operating in the same way as Composition Example 1 except using stearyl methacrylate 30 g, dimethylaminopropyl methacrylamide 10.0 g and methyl methacrylate 10.0 g.

The examples of water absorbent polymer will be shown hereinafter.

EXAMPLE 1

N-hexane 360.7 g and the dispersing agent (1) 4.32 g were fed in a liter separatory flask equipped with an agitator, a reflux condenser, a dropping funnel, a thermometer and a nitrogen gas introduction tube, temperature was raised to 50° C. to disperse and dissolve and the atmosphere was replaced with $N_2$.

On the other hand, acrylic acid 72.0 g was partially neutralized by means of sodium hydroxide 32.2 g dissolved in ion exchange water 103.6 g in a conical flask in advance and potassium persulfate 0.24 g was dissolved therein under room temperature. This monomer aqueous solution was dropped into the above-described separatory flask under nitrogen bubbling at an agitation speed of 300 rpm for an hour. After reflux for two hours, 30% aqueous hydrogen peroxide 0.1 g was added and polymerization was perfectly finished by continuing reflux for an hour. Thereafter, ethylene glycol diglycidyl ether 0.73 g was added, azeotropic distillation was performed to dry under reduced pressure after filtration and white bead-like polymer was obtained. Further, there was little attachment of polymer in the separatory flask.

The obtained dry polymer showed that the water absorbency to ion exchange water was 125 (g/g), the water absorbency to 0.9% salt water was 33 (g/g), the particle size in dry condition was 120 μm and the particle size when water was absorbed was 480 μm. And, the particle independence when water was absorbed was shown.

EXAMPLES 2 AND 3

White bead-like polymer was obtained by operating in the same way as Example 1 except using the dispersing agent (2), (3) obtained in the Composition Examples 2, 3 instead of the dispersing agent (1) of Example 1. Further, there was little attachment of polymer in the separatory flask.

EXAMPLE 4

White bead-like polymer was obtained by operating in the same way as Example 1 except using cyclohexane instead of n-hexane of Example 1. And, there was little attachment of polymer in the separatory flask.

EXAMPLES 5-6

White bead-like polymer was obtained by operating in the same way as in Example 1 except changing ethylene glycol diglycidyl ether 0.73 g in Example 1 into 0.18 g and 1.46. Further, there was little attachment of polymer in the separatory flask.

COMPARISON EXAMPLE 1

White bead-like polymer was obtained by operating in the same was as Example 1 except not adding ethylene glycol diglycidyl ether of Example 1. And, there was little attachment of polymer in the separatory flask.

COMPARISON EXAMPLE 2

White powdery polymer was obtained by operating in the same way as Example 1 by using sorbitan monolaurate instead of the dispersing agent (1) of Example 1. Further, the attachment of polymer appeared at the wall surface and the agitating blade in the separatory flask.

COMPARISON EXAMPLE 3

Commercially available product AQUALIC CA-W (made by NIHON SHOKUBAI KAGAKU KOGYO KABUSHIKI KAISHA)

The result of evaluation in Examples 1 through 6 and the Comparison Examples 1 through 3 will be shown in FIG. 2.

The examples of production methods of fine grain ice and concrete/mortar will be shown hereinafter.

EXAMPLE A (FINE GRAIN ICE)

Drinking water 100 kg was fed in a 100 liter vessel equipped with an agitator and the water absorbent polymer 1.0 kg of Example 1 was gradually added to during agitation. After water was absorbed, agitation was stopped and the fine grain polymer which absorbed water was ejected to freeze. Then, the frozen polymer became independent fine grain ice by simple mechanical operation and was agitated by a mixer in the following proportioning ratio and mortar was manufactured.

cement: fine grain ice: quartz sand (bone dry) = 100:28:20

This mortar was formed into a plate which was 50 mm wide and 12 mm thick by a vacuum deaeration type extrusion molding machine. Five specimens which were 350 mm long were made by using this plate and a bending tension test was performed after curing at room temperature for 14 days. On this occasion, then bending tension strength (kg/cm$^2$) was 185.3, 211.1, 237.2, 191.0 and 177.9 and the average was 200.5 kg/cm$^2$.

EXAMPLE B (FINE GRAIN ICE)

After water was absorbed, powder mixture was performed in the following ratio by using frozen fine grain polymer by the same method as the above-described one.

cement: fine grain ice: quartz sand (bone dry) = 100:24:20

Thereafter, the plate which was 50 mm wide and 12 mm thick was formed by means of a vacuum deaeration type extrusion molding machine. The bending tension strength (kg/cm$^2$) of this plate which was cured for 14 days at 20° C. in a room was 249.5, 220.1 and 220.3 and the average was 230.0 kg/cm$^2$.

EXAMPLE C (FINE GRAIN ICE)

After water was absorbed, powdery mixture was performed in the following ratio by using the frozen fine grain polymer in the same manner as the above-mentioned to form by a vacuum deaeration type extrusion molding machine.

cement: fine grain ice: quartz sand (bone dry) = 100:32:20

On this occasion, the bending tension strength (kg/cm$^2$) of this plate after curing at 20° C. in a room for 14 days was 176.8, 157.0 and 146.1 and the average was 160.0 kg/cm$^2$.

EXAMPLE D (DRY CLATHRATE WATER)

Drinking water 50 kg was fed in a 100 liter vessel equipped with an agitator and water absorbing polymer 1.0 kg was gradually added during agitation. After water was absorbed, agitation was stopped to manufacture dry clathrate water. By using this dry clathrate water, agitation was performed by means of a mixer in the following proportioning ratio to manufacture mortar.

cement: dry clathrate water: quartz sand (bone dry) = 100:28:20

The bending test result of the plate manufactured and cured in the same manner as the above-mentioned Example A by using this mortar was 218.4, 179.5 and 180.9 and the average was 192.9 kg/cm$^2$.

EXAMPLE E (DRY CLATHRATE WATER)

The same method as the Example D was performed. The bending test result of the plate in the following ratio was 241.5, 216.8 and 206.3 and the average was 221.5 kg/cm$^2$.

cement: dry clathrate water: quartz sand (bone dry) = 100:24:20

EXAMPLE F (DRY CLATHRATE WATER)

The same method as Example D was performed.

The bending test result of the plate in the following ratio was 166.3, 147.0 and 146.1 and the average was 153.1 kg/cm$^2$.

cement: dry clathrate water: quartz sand (bone dry) = 100:32:20

The present invention is explained according to the examples described hereinbefore. But, the examples described in the present specification are not restricted to the exemplified ones. And, the range of the invention is supported by the attached claims and not bound by the description of the examples. Accordingly, all variations and changes to the claims are within the scope of the present invention.

We claim:

1. A method for the production of water absorbent polymer beads which retain a bead like shape after absorption of water which comprises:
   i) dissolving a copolymer as a dispersing agent in an aliphatic hydrocarbon to form a solution; said copolymer comprising the following:
      a) an alkyl acrylate or methacrylate monomer having an alkyl group of eight or more carbon atoms, in the amount of 45 to 70 weight percent,
      b) one or more kinds of monomers selected from the group consisting of acrylic acid, methacrylic acid, itaconic acid, dimethylaminoethyl acrylate, dimethylaminoethyl methacrylate, diethylaminoethyl acrylate, diethylaminoethyl methacrylate, acryloyloxyethyltrimethylammonium chloride, methacryloyloxyethyltrimethylammonium chloride, 2-hydroxyethyl acrylate, 2-hydroxyethyl methacrylate, 2-hydroxypropyl acrylate, 2-hydroxypropyl methacrylate, acrylamide, dimethylacrylamide, dimethylaminopropylacrylamide, dimethylaminopropylmethacrylamide, acrylamidepropyltrimethylammonium chloride, and methacrylamidepropyltrimethylammonium chloride in the amount of 5 to 25 weight percent, and
      c) unsaturated monomers having affinity with an aliphatic hydrocarbon solvent selected from the group consisting of alkyl methacrylates wherein the alkyl group contains less than 5 carbon atoms and vinyl acetate, being capable of copolymerizing with the above-mentioned (a) and (b) so as to raise the glass transition temperature of said copolymer, in the amount of 20 to 40 weight percent,
   ii) dispersing a solution of an acrylic acid and an alkali metal salt of an acrylic acid obtained by partially neutralizing an acrylic acid, in said solution of said copolymer in said aliphatic hydrocarbon, and then polymerizing the resultant mixture by water/oil suspension polymerization so as to subject said resultant mixture to a self-crosslinking reaction, and
   iii) subjecting said resultant polymer of ii) to a cross-linking reaction in the presence or absence of an inorganic compound by means of crosslinking agent and
   iv) drying to form beads.

2. The method for the production of the water absorbent polymer according to claim 1 wherein the crosslinking agent is ethylene glycol diglycidyl ether.

3. The method for the production of the water absorbent polymer according to claim 1 wherein the amount of the crosslinking agent is 0.05 to 2 weight percent of the amount of the partially neutralized acrylic acid.

4. The water absorbent polymer produced according to claim 1.

* * * * *